Patented June 13, 1939

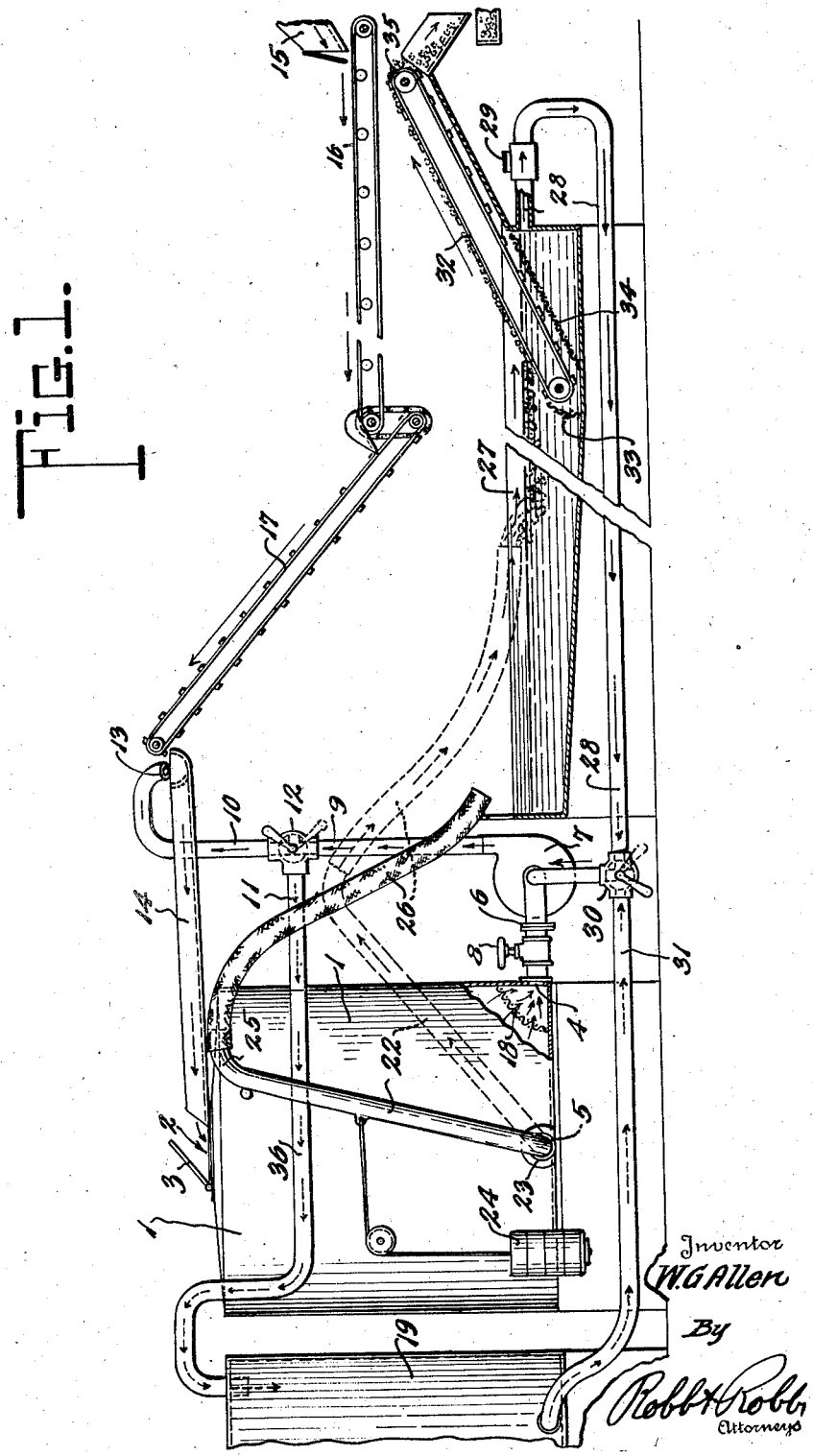

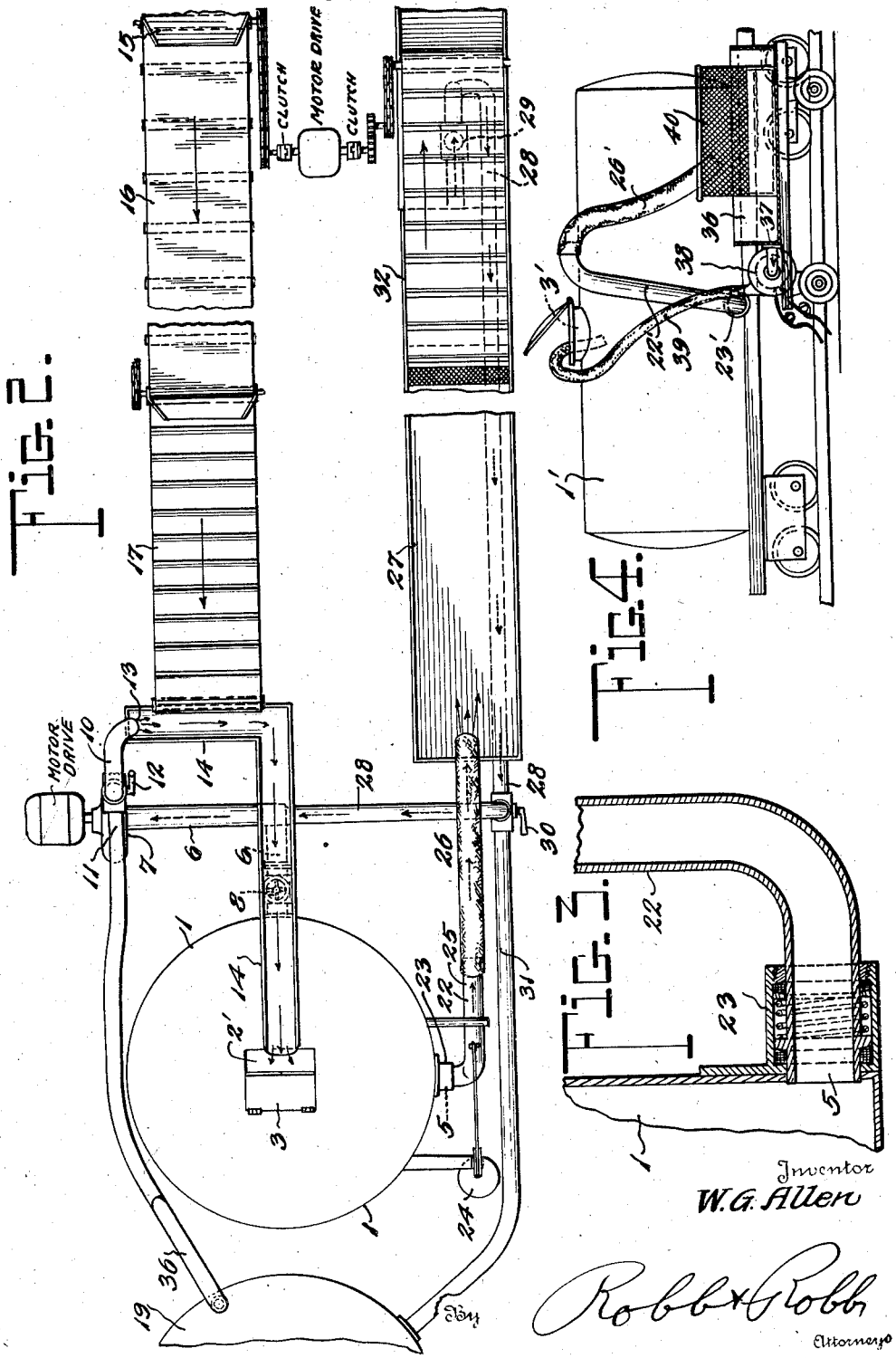

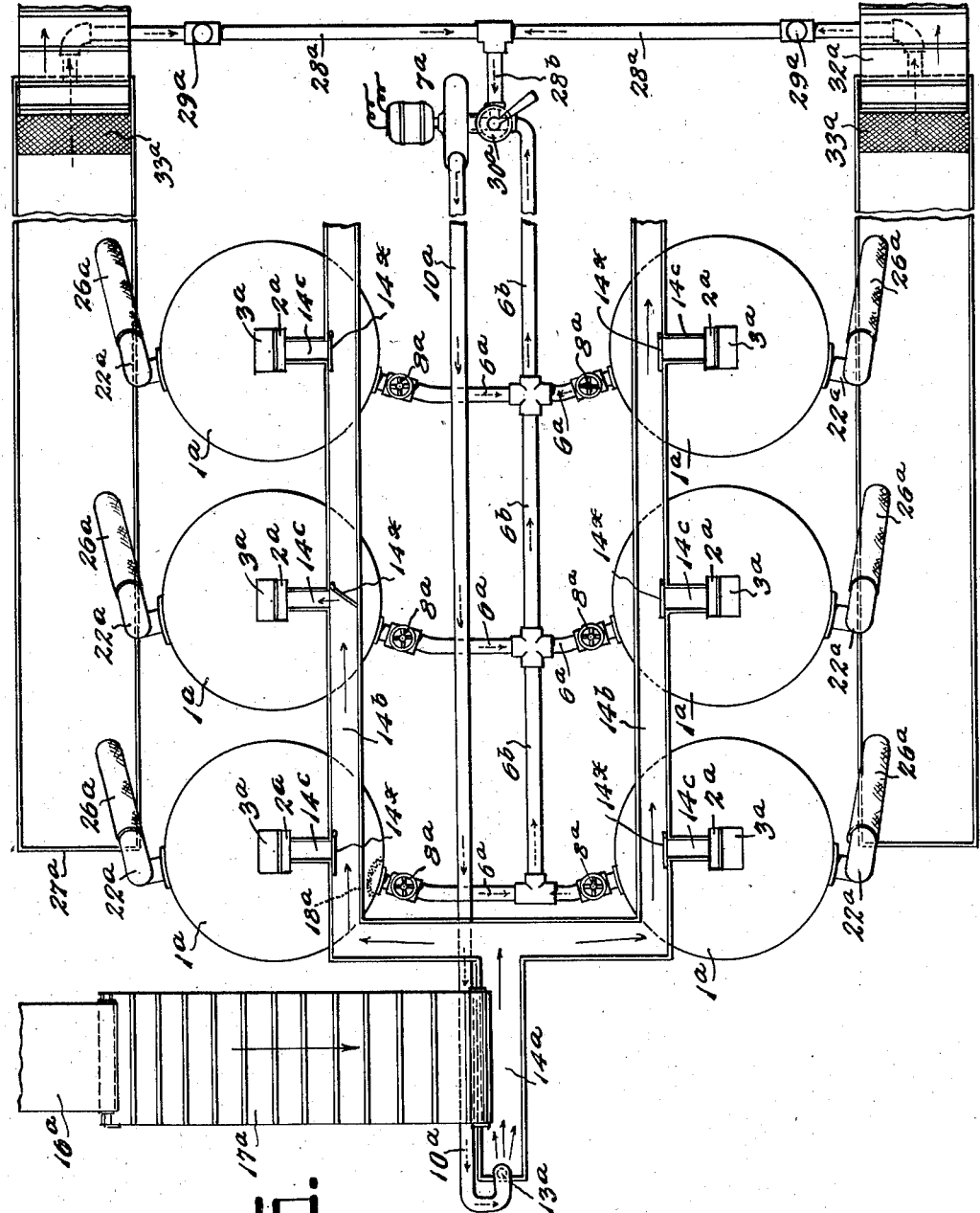

2,162,415

UNITED STATES PATENT OFFICE 2,162,415

APPARATUS FOR HANDLING FRUITS

William G. Allen, Salem, Oreg.

Application March 22, 1937, Serial No. 132,383

12 Claims. (Cl. 214—17)

This invention relates to the art of preserving, storing and delivering perishable articles, particularly small fruit such as cherries, berries and the like.

An object of my invention is the utilization of a preserving liquid as the sole means for conveying the fruit to the place of storage, and later for discharging and conveying the fruit from the storage container to a remote point for packaging or further disposal thereof.

An object of my invention is the provision of a comparatively large free and unobstructed discharge passage leading from the bottom or lower portion of the storage container in which preserving is carried out, said passage having a discharge port arranged to extend above the level of the preserving liquid in the storage container, and being variably shiftable to locations below the surface of the liquid causing a gravity flow of the liquid and fruit from the container, thereby eliminating the use of obstructions such as valves etc., in the discharge passage which might damage the fruit in its passage from the container.

A further object is the provision of a circulation system for the preserving liquid exteriorly of the container for initially conveying the fruit to the container to be stored therein, and subsequently utilizing the fluid for conveying the fruit from the container to a designated point of discharge.

In carrying out my invention, I employ a storage container or tank of comparatively large capacity having a fluid outlet at the bottom thereof and a fluid and fruit inlet at the top, and a fluid circulation system including pump means for withdrawing the fluid from the container outlet and returning the fluid to the container at the inlet, together with means for introducing the fruit into the circulating fluid at a point intermediate the pump and the inlet.

In discharging the fruit from the container, I utilize a large pipe connecting an outlet port in the lower part of the container, and by the provision of a pivoted elbow-swinging joint connection with the container, the discharge end of the pipe is shiftable from a position above the level of the liquid to a point below to effect a natural gravity flow of liquid and fruit from the container. Means for separating the fruit from the liquid and returning the liquid to the container are also provided.

In the handling of fruits, such as cherries, it is highly important that the various handling operations shall be carried out without subjecting the cherries during the introduction of the fruit into the preserving containers, as well as during the discharge of the fruit therefrom, to damage or bruising, and my system is carried out in such a manner as to effectively prevent injury, either from the weight of the fruit itself or from the flowing operations of charging and discharging the fruit into or from the preserving vessels.

More specifically, the charging of the fruit into the receptacles is effected by a circulation of the preserving liquid into which the fruit is introduced, and the discharge of the fruit from the vessels is likewise accomplished by a circulation of the preserving liquid into the vessel as a discharge of the fruit and liquid therefrom takes place.

In carrying out this process, I preferably employ a preserving liquid of a specific gravity which tends to hold the fruit in suspension, and while the specific gravity of the fruit is actually somewhat greater than that of the preserving liquid, it is possible to maintain such a balanced relationship as to effect discharge of the fruit by a flotation process, so long as a circulation of the liquid is maintained.

Under ordinary conditions, it will be apparent that if the discharge of the fruit and liquid were effected by opening a drain leading from the container, the liquid would quickly pass out of the receptacle at a faster rate than the fruit, which would allow the liquid to be exhausted from the container before all of the fruit was discharged and cause the fruit to be damaged by its superimposed weight.

In my novel system of handling, a stream of liquid is flowed into the receptacle as the discharge operation takes place, so that the fruit is maintained in a more or less suspended condition, the liquid flowed in during the discharge being either caused by a re-circulation of the discharging liquid or the flowing of a suitable quantity of the preserving fluid from an auxiliary supply.

The return of the liquid can be controlled so that the level of the fruit and liquid in the container will gradually drop as the discharge is effected, such control being produced either by a pump having a predetermined capacity to flow the circulated liquid at the desired reduced rate, or by valve means introduced into the recirculation conduits whereby a portion of the liquid may be shunted to storage while the remaining portion is used for the recirculation supply.

By way of summary, the apparatus of my system is composed of a sorting and inspection conveyor associated with a relatively large storage tank, and means for conveying the sorted fruits from said conveyor to the storage tank, together with a fluid circulation means for effecting recirculation of the preserving fluid during charging or discharging of the storage container and means for discharging the fruit and liquid from the storage container by gravity and recirculating flow.

Other and further objects and advantages of the invention will be hereinafter set forth and the novel features thereof defined by the appended claims.

In the drawings:

Fig. 1 is a side elevation diagrammatically illustrating my complete system, certain parts being broken away and shown in section;

Fig. 2 is a top plan view of the construction shown in Fig. 1;

Fig. 3 is a vertical section through the pivoted elbow connection of the fruit discharge pipe with the storage container; and Fig. 4 is a side elevation of my fruit discharge tube showing its application to a tank car; and Fig. 5 is a top plan view diagrammatically illustrating an embodiment of my invention, showing its adaptation to a plurality of storage containers.

Referring to the drawings, in which like reference characters refer to like parts in the several figures thereof, 1 denotes a storage tank or container having an inlet opening 2 in the top and a closure 3 for sealing the container after the same has been filled with the fruit and suitable preserving liquid, such as sulphur dioxide solution of proper concentration.

The container is provided at or near the bottom with the outlets 4 and 5, the outlet 4 having a communicating conduit or pipe 6 leading therefrom to the intake opening of the centrifugal or impeller pump 7. A suitable valve 8 is preferably provided for controlling the passage of fluid from the container through the pipe 6.

The fluid discharged by the pump 7 is conveyed upwardly through the pipe 9 and discharged into either the pipe 10 or the pipe 11, depending upon the position of the three-way valve 12. With the valve 12 in full line position, the liquid being circulated will be conveyed through the pipe 10 and discharged at 13 into a receiving trough 14 and conveyed back into the tank 1 through the opening 2.

The articles or fruit to be preserved, such for example as cherries, berries or other small fruit, is first emptied from the lug boxes (not shown) into a suitable chute 15 leading to the inspection and sorting belt or conveyor 16. This belt is slowly moved at a substantially uniform rate in the direction of the arrow in Fig. 1 to permit inspection of the fruit and removal of objectionable fruit and foreign matter. From the end of this picking or inspection belt, the fruit is automatically emptied on to an elevator 17 consisting of a drive belt with cross cleats, as shown in the drawings, although a bucket elevator may be substituted therefor, as may be required for the handling of certain types of produce to be preserved. This conveyor elevates the fruit to a discharge point above the receiving trough 14.

From the elevators 17 the fruit discharges into the receiving trough 14 and is conveyed by the preserving liquid, which is being discharged at 13 from the pipe 10, as hereinbefore described.

The trough 14 conveys the fruit and liquid into the inlet 2 at the top of the storage container 1.

The recirculation of the fluid from the container 1, together with the introduction of the fruit in the manner described, is continued until the tank 1 is filled with the desired amount of fruit. A screen member 18 is disposed across the discharge opening 4 to thereby prevent any fruit from being recirculated with the preserving fluid.

Any surplus fluid displaced by the fruit introduced into the tank 1 may be conveyed to a suitable storage space or container 19 through the pipe 11 upon shifting the three-way valve 12 to its dotted line position.

The closure 3 is now closed and, if desirable, the valve 8 may also be closed, thus maintaining the fruit and its preserving liquid in sealed condition within the container 1 and thereby preventing the evaporation of said fluid during the preserving period, or until the time when it is desired to dispense the fruit for packaging or other purposes.

The port 5 in the lower portion of the tank 1 communicates with a discharge pipe 22 having a suitable pivoted elbow connection 23, thus permitting swinging movement of the pipe 22 in a vertical plane. The discharge end of the pipe 22 is normally retained above the level of the liquid in the container 1 by any suitable means, such as a counter-balancing weight 24, the upper end of the pipe 22 being preferably curved at 25 and provided at this point with a flexible fabric discharge hose 26. This hose extension is preferably maintained at an elevated position until it is desired to discharge the fruit from the container.

When it is desired to remove the fruit from the tank 1, the discharge pipe 22 is swung to lower the end 25 below the level of the fluid and fruit in the container 1 causing the liquid and fruit to flow by gravity from the tank. The fruit and liquid may thus be conveyed by the flexible hose member 26 to any point desired or into smaller shipping containers, if the fruit is to be dispensed in this manner. Or, as shown in the drawing, the liquid and fruit may be separated upon discharge, the fruit being conveyed to a suitable point of discharge, while the liquid is returned to the container 1 or the storage container 19 for further use.

In order to accomplish this separation, I employ a trough 27 suitably disposed to receive the fruit and liquid from the hose 26, the fruit being conveyed by the natural circulation of the liquid in the trough toward the discharge pipe 28 located at the desired liquid level in the trough. This trough discharge pipe leads back to the intake side of the impeller pump 7 and is provided with a check valve 29 to prevent flow of fluid from the tank 1 to the trough 27 when the pump is not operating.

A three-way valve 30 is provided in this conduit 28 and to this valve is connected a branch pipe 31 leading from the auxiliary container 19. The valve 30 is shiftable in one position to establish communication between the trough 27 and the pump 7 and to a second position to interrupt such communication and establish communication between the storage container 19 and the pump 7. This valve may be further moved to a position cutting off flow from the tank 19 as may be desired under certain conditions of operation of the system.

An inclined conveyor 32 similar to the conveyor 17 is disposed with one end thereof in the trough 27 below the surface of the liquid and by means of this conveyor, the fruit is elevated from the trough and discharged into packaging containers, or otherwise disposed of as may be required. Screens 33 and 34 are preferably provided to prevent the fruit from entering the discharge pipe 28 or into the space between the upper and lower reaches of the conveyor 32.

When it is desired to remove the fruit from the tank 1, the discharge pipe 22 is lowered, permitting the fruit and liquid to discharge into the trough 27. The pump 7 and conveyor 32 are put into operation with the three-way valve 30 in full-line position establishing communication between the pump 7 and through discharge 28. As the fluid and fruit is discharged, it is conveyed by its associated liquid to the conveyor 32 where it is elevated out of the liquid and discharged at 35, while the liquid is returned by the pump 7 and pipe 10 to the tank 1 by way of the trough 14. This circulation may be continued until all of the fruit is removed from the tank 1.

If there is any tendency of the fruit to float in the liquid, the three-way valve 12 may be shifted to dotted line position which will convey the return fluid through the return pipe 11 to the auxiliary or liquid storage chamber 19. Under these conditions, the level of the liquid will gradually drop in the tank 1, causing the fruit to be gradually introduced into the opening 5 and as the level drops, it will be necessary to gradually lower the end of the discharge pipe 22 until the tank 1 is completely emptied of the fruit and liquid. During this discharge operation, the valve 8 is preferably closed.

The three-way valves 30 and 12 may now be shifted to their other positions, whereupon the fluid from the storage pipe 19 is withdrawn through pipe 31 and forced by the pump 7 through the pipe 10 and discharged at 13 into the return trough 14, thus again filling the tank 1.

Cherries or other fruit may be introduced into the trough 14 at this time. The three-way valve 30 may also be operated to supply the main container 1 with additional preserving liquid from the storage container when desired.

In the adaptation of my invention, it will be understood that the fruit, together with its preserving liquid, may be shipped to distant points in tank cars, such as I have illustrated in Fig. 4 of the drawings, this method of shipment being particularly effective for transferring large quantities of the preserved fruit without injury to the fruit incident to the transfer operation. Such a vehicle, which may be also in the nature of a tank truck, is preferably provided with a discharge pipe 22' pivotally connected to the tank at 23' and having a flexible discharge hose 26', all corresponding to the discharge pipe shown in Fig. 1 of my system.

It will be obvious that the pipe 22' is retained in its vertical position until it is desired to empty the fruit from the car or truck, at which time the end of the pipe may be lowered, permitting the fruit and preserving liquid to pass therefrom under the influence of the gravity had within the tank 1'.

Suitable means are provided at the delivery point of the tank car or truck for the recirculation of the preserving liquid during the discharge of the vehicle, including means for separating the fruit from the liquid during this recirculation. This apparatus is similar in principle of operation to that disclosed in Fig. 1 of the drawings.

A suitable receiving trough 36 is provided having a fluid discharge port 37 leading to a motor driven impeller pump 38 having a return pipe 39 for returning the liquid to the inlet opening 3' in the top of the container 1' of the tank car or truck. A foraminous basket 40 is disposed within the trough 36 for separating the fruit from the liquid, permitting return of the liquid by the pump 38 of the tank 1'.

A flexible discharge hose 26' on the end of the pipe 22' is placed within the basket 40 and upon lowering of the discharge pipe, fruit and liquid will flow together by gravity from the container 1 into the basket 40. The pump is set into operation, returning the liquid to the container and this recirculation is continued until the basket or container 40 is filled with the desired amount of fruit whereupon the pipe 22 is elevated to interrupt the discharge. The container or basket 40 may be emptied or replaced and the process continued until the fruit has been completely removed from the car container 1'.

I have shown a portable apparatus in Fig. 4, but it is contemplated that a system identical with that shown in Figs. 1 and 2 may be used for emptying as well as charging the tank car or trucks.

In a commercial embodiment of my invention, as disclosed in Fig. 5 of the drawings, I may utilize a system embodying a battery of tanks or containers having a common cooperating filling liquid recirculating and fruit discharge means. In this figure the parts corresponding to those disclosed in Fig. 1 are given like reference characters.

In this arrangement a plurality of tanks or containers 1a are arranged in rows or groups, each tank having a top inlet opening 2a, a closure 3a therefor, and a screened liquid discharge port 4a connected with the valve controlled passage or conduit 6a. The conduits 6a from all of the containers are preferably connected with their common return pipe 6b for returning the preserving liquid to a power driven impeller pump 7a.

A three-way valve 30a is provided in this return connection and has a branch pipe or conduit 28b connected with the return conduit 28a of the fruit and liquid receiving troughs 27a. A screen 33a for separating the fruit from the liquid in this trough is provided, as seen in Fig. 5, the fruit being separated and removed from the trough by the conveyor 32a.

A fruit receiving and conveying trough 14a receives the fruit from the conveyor 17a and the preserving liquid from the end 13a of the fluid circulating pipe 11a, this pipe conveying liquid from the impeller pump 7a. The trough 14a is provided with branch troughs 14b extending past the openings in the rows of containers 1a. Each of these branch troughs is provided with a gate controlled discharge trough 14c emptying into one of the container inlet openings 2a.

The trough gate or valve is indicated at 14x and is movable to admit fluid or fruit into the trough 14c or to prevent such admission, in which event another of the valve 14x will be opened for recirculation of the fluid into another container.

Each of the containers is provided with a fruit and fluid discharge pipe 22a, swingable to lower its discharge end for directing the fruit and preserving or circulating liquid into one of the troughs 27a.

When introducing fruit into one of the containers, the three-way valve 30a in Fig. 5 is shifted to full line position and the valve 8a of the container to be filled with fruit is opened; also the proper gate valve 14x is shifted to direct the contents of the trough 14b into the container 1a.

When the pump is set into operation, liquid will be withdrawn from the bottom of the container and will be discharged into the end of the trough 14a, and as the fruit is discharged into this trough from the end of the conveyor 17a, the liquid will convey the fruit into the desired container.

In the emptying of any particular container of its fruit contents, the valve 8a will be closed; also the three-way valve 30a will be shifted to its other position. Upon lowering of the discharge pipe 22, the fruit and liquid will be discharged into the trough 27a, the fruit being conveyed by the liquid toward the end of the trough and separated from the liquid by the screen 33a and thus being removed from the trough by the conveyor 32a for subsequent disposal.

The preserving fluid is passed through the screen 32a and into the conduits 28a and 28b and is returned by the pump 7a into the trough 14a and its branches 14b and 14c, back to the container again. This recirculation continues until the tank has been completely emptied of its fruit contents.

If it is desired to lower the level of the liquid in the container being discharged, part of the liquid being returned can be shunted into any one of the other tanks upon partial opening of its control gate 14x, this tank under the circumstances serving as a storage container.

Check valves 29a are provided in this embodiment, as in Fig. 1, to prevent a return flow of the liquid in the pipe 28a upon stoppage of the impeller pump 7a.

The particular advantage of my method of handling the fruit will be apparent from the foregoing description wherein I have pointed out that the preserving fluid itself is utilized for conveying the fruit to and from the preserving container, and in the arrangement I have eliminated the use of valve devices which would tend to obstruct the discharge conduit or cause injury to the fruit in the discharge of the same from the containers.

By utilizing this same preserving fluid in a recirculating operation, the introduction of the fruit into the container is also facilitated and injury to the fruit more or less prevented by the flotation of the fruit in the liquid stream.

Having thus described my invention, what I claim as new and desire to secure by Letters Patent is:

1. Apparatus for treating and handling fruit comprising a storage container for holding a preserving liquid, said container having an inlet for charging fruit into the liquid and a discharge outlet below the level of the liquid, means for withdrawing the liquid and fruit from said container and returning the liquid withdrawn to the container at a rate to cause the level of fruit and liquid in the container to progressively fall until contents of the container are completely discharged.

2. In a fruit storing and preserving apparatus of the class described, a storage container adapted to contain a preserving liquid, means exterior of the container for causing circulation of the liquid through the container including an open trough discharging into the upper portion of the container, pump means for withdrawing liquid from the container and discharging the same into one end of the trough, and conveyor means for receiving fruit and discharging the same into the trough.

3. In a fruit handling apparatus of the class described, a storage container adapted to contain fruit and a preserving liquid, conduit means connected with the container for establishing a circuit of the liquid to charge fruit into the container and maintaining a supply of the liquid therein, and means for withdrawing liquid and fruit from said container under the action of gravity including conduit means connected with the first-mentioned circuit for returning the liquid to the container.

4. In a fruit handling and storage apparatus of the class described, a storage container, adapted to contain fruits and a preserving liquid, a liquid recirculation means for recirculating the liquid in the container completely, means for introducing fruit into the container, means for preventing recirculation of the fruit with the liquid, and recirculation means for discharging fruit and liquid from the container, separating the fruit from the liquid, and recirculating the liquid.

5. In a fruit handling and storage apparatus of the class described, a storage container, adapted to contain fruits and a preserving liquid, a liquid recirculation means for recirculating the liquid in the container completely, means for introducing fruit into the container, means for preventing recirculation of the fruit with the liquid, recirculation means for discharging fruit and liquid from the container, separating the fruit from the liquid, and recirculating the liquid, and pump means for effecting said recirculations common to both of said recirculation means.

6. In a fruit handling apparatus, a fruit storage container having an inlet, a screened liquid outlet and a fruit and liquid outlet, an unobstructed discharge conduit connected with the fruit and liquid outlet, a container for receiving the fruit and liquid from said conduit, pump means, a conduit between said pump means and said last container, means intermediate said pump means and said last container for separating fruit from the liquid, a second conduit connecting the screened outlet with said pump means, a common liquid return conduit between said pump means and said container inlet, and means for introducing fruit into the last mentioned conduit.

7. In a fruit handling apparatus, a fruit storage container having an inlet, a screened liquid outlet and a fruit and liquid outlet, an unobstructed discharge conduit connected with the fruit and liquid outlet, a container for receiving the fruit and liquid from said conduit, pump means, a conduit between said pump means and said last container, means intermediate said pump means and said last container for separating fruit from the liquid, a second conduit connecting the screened outlet with said pump means, a common liquid return conduit between said pump means and said container inlet, means for introducing fruit into the last mentioned conduit, and means regulating the return flow of liquid from said screen outlet and said second container to said pump means.

8. In a fruit handling apparatus, a fruit storage container having an inlet, a screened liquid outlet and a fruit and liquid outlet, an unobstructed discharge conduit connected with the fruit and liquid outlet, a container for receiving the fruit and liquid from said conduit, pump means, a conduit between said pump means and said last container, means intermediate said pump means and said last container for separating fruit from the liquid, a second conduit connecting the screened outlet with said pump means and said container inlet, means for introducing fruit into the last mentioned conduit, an auxiliary liquid storage container, and means for introducing additional liquid from said auxiliary storage container into said conduits.

9. In a fruit handling apparatus, a fruit storage container having an inlet, a screened liquid outlet and a fruit and liquid outlet, an unobstructed discharge conduit connected with the fruit and liquid outlet, a container for receiving the fruit and liquid from said conduit, pump means, a conduit between said pump means and said last container, means intermediate said pump means and said last container for separating fruit from the liquid, a second conduit connecting the screened outlet with said pump means and said container inlet, means for introducing fruit into the last mentioned conduit, an auxiliary liquid storage container, means for introducing additional liquid from said auxiliary storage container into said conduits, and regulatable means for conveying the liquid recirculated by said pump means into said storage container.

10. In a fruit handling and storage apparatus of the class described, a plurality of storage containers each having a screened circulation liquid outlet, an unobstructed fruit and liquid outlet at the bottom thereof, a fruit and liquid inlet at the top thereof, a plurality of liquid circulation conduits connecting said screened outlets with said fruit and liquid inlets, valve means in said conduits for selectively closing any of said outlets and any of said inlets, common pump means for said circulation conduits, and means for introducing fruit into said circulation conduits between the common pump means and said fruit and liquid inlets.

11. In a fruit handling and storage apparatus of the class described, a plurality of storage containers each having a screened circulation liquid outlet, an unobstructed fruit and liquid outlet at the bottom thereof, a fruit and liquid inlet at the top thereof, a plurality of liquid circulation conduits connecting said screened outlets with said fruit and liquid inlets, valve means in said conduits for selectively closing any of said outlets and any of said inlets, common pump means for said circulation conduits, means for introducing fruit into said circulation conduits between the common pump means and said fruit and liquid inlets, a receiving trough for receiving fruit and liquid from said unobstructed fruit and liquid outlets having a liquid return conduit extending therefrom to said pump means, and means intermediate said unobstructed outlets and said liquid return conduit for removing the fruit from said liquid being returned to said pump means.

12. In a fruit handling apparatus of the class described, a fruit and liquid storage container, a plurality of liquid re-circulation conduits exterior of said container, common pump means for said conduits, an unobstructed outlet in said container connected to one of said conduits, means in the last conduit for removing fruit from the liquid during said circulation, and a second screened outlet in the container connecting the other conduit and means for introducing fruit to be handled into said other conduit for conveyance by the re-circulated liquid into said container.

WILLIAM G. ALLEN.